UNITED STATES PATENT OFFICE.

JOSEPH R. DRANEY, OF NEW YORK, N. Y., AND LEROY M. LAW, OF BALTIMORE, MARYLAND, ASSIGNORS, BY MESNE ASSIGNMENTS, TO BITOSLAG PAVING COMPANY, OF NEW YORK, N. Y., A CORPORATION OF DELAWARE.

PAVING COMPOSITION.

1,364,622. Specification of Letters Patent. Patented Jan. 4, 1921.

No Drawing. Application filed April 29, 1919. Serial No. 293,549.

*To all whom it may concern:*

Be it known that we, JOSEPH R. DRANEY and LEROY M. LAW, citizens of the United States, residing, respectively, at New York, county of New York, and State of New York, and Baltimore, Maryland, have invented new and useful Improvements in Paving Compositions, of which the following is a specification.

The present invention relates to improvements in mixtures for paving and other purposes.

It has for its object to provide a plastic mixture of a bituminous substance and a mineral material of such character that the mixture is practically stable under all conditions, and precipitation and separation of the mineral substance from the bituminous substance is eliminated or so reduced as to be negligible for practical purposes.

In the manufacture of bituminous mixtures for paving and other purposes it has been heretofore proposed to take a binder of bituminous or pitchy character, and mix that substance with mechanically pulverized mineral material to form a filler or binder, which filler is afterward mixed with a mineral aggregate to form the batch of road or other material. These mixtures have been variously compounded, and the mineral content has been of diverse character, different materials, possessing certain advantages, having been reduced mechanically to pulverized form and mixed with the bituminous substance. Many of such mixtures are valuable and have been used with success in road building. A difficulty which has arisen, however, is, that the mechanically reduced material which has been used, while it combines with the bituminous substance and produces a mixture in which primarily considerable stability exists, such stability rapidly diminishes, and a relatively rapid precipitation and separation of the mineral content from the bituminous substance takes place, destroying the dispersive continuity of the mineral substance throughout the mass.

The practical disadvantage of the mixtures now known to us is, that the filler or binder, which is ordinarily compounded from the bituminous substance and the mineral at the refining works and shipped in containers to the point of use, will, in a comparatively short time, become separated into two distinct areas, the mineral content gravitating to the bottom of the container and forming an area having an excess of mineral content relative to the original dispersion of mineral material, while the area at the top of the container will be low in mineral content and practically completely bituminous, this separating the filler in such shape that when used there will be an unequal mixture, the lower area containing practically all of the mineral content, which is precipitated thereto, while the upper area is composed almost entirely of the bituminous substance. This results in an unequal distribution of bituminous substance and mineral content which go to make up the filler, with the mineral aggregate, when the batch of paving material is made, and roads or other surfaces formed from the batch will not have equal wear-resisting qualities.

The same precipitation of the mineral content of the filler which takes place in the containers, as outlined above, will, of course, occur to a considerable degree in the finished or laid paving or other construction, and thus cause an inequality in the layer or sheet which is undesirable in the finished product.

Our invention is designed to overcome this difficulty, which is present in materials of this nature as heretofore produced, and we accomplished this by utilizing as the mineral content a material not before used in the making up of fillers or binders, and which is of such character that the element of precipitation, when this material is mixed with the bituminous substance, is negligible, and a mixture is produced which will preserve its continuity and stability under various conditions of temperature and during long periods of storage in containers or use in paving or coating constructions.

The mineral content which is used in accordance with our invention is the electrically precipitated dust from reducing plants, either of the mechanical or metallurgical type, or both, among which may be mentioned smelting plants, ore stampers, rock crushers, milling plants, and the like, in which plants the floating discharges carry a considerable content of mineral dust.

It is now common in plants of this character to provide stacks, or equivalent conduits, through which the fumes, or the mechanically produced dust rises, which dust is of such impalpable character that it can not be removed by any known mechanical means, with electrical precipitation apparatus, of which there are various types, and in which, by making use of a static discharge, the suspended atoms are charged, according to their conductivity, and attracted or impelled and cling to the walls of the stack or to suitable collectors within the stack, being thereafter thrown down by mechanical knockers or other suitable devices.

This electrically precipitated dust is of a quality or fineness impossible to produce by any known methods of mechanical milling or reduction, and is largely, if not entirely, a by-product of the plants mentioned; the electrical precipitation having been primarily undertaken to eliminate the disagreeable and destructive effects of the dust laden air on surrounding property. It has been found in connection with some of the metal bearing ores that a considerable amount of metal can be recovered from this precipitated dust by appropriately treating it for the removal of the values, but in many plants and in all in which other than metal bearing rock is reduced, the dust is a by-product at present and without value. This dust, when mixed with the bituminous substance, not only combines readily to form a filler, giving a smooth, continuous, and remarkably even mixture, but, because of its impalpability and atomic character, will remain practically in continuous suspension, its precipitation being so slight as to be negligible for all practical purposes, so that a filler or binder is produced which may be stored at or shipped for long distances from the refining plant without danger of being found in non-continuous precipitated condition when used.

The proportions of bituminous substance and dust will, of course, vary with the needs of the work, some compounds for certain purposes requiring a different proportion of ingredients than others. We have found that at least one or two per cent. of the dust should be used, although this may be increased to any percentage desired so long as the content of dust does not interfere with the desired flow or plasticity of the mixture or reach the point where the continuity of the bituminous substance throughout the mass is interfered with, for it is essential in mixtures of this character that there be no interruption in the continuity of the bitumen or similar content.

We preferably use the electrically precipitated dust of slate, this being of uniform character and being free from soluble substances which might be deleterious in a paving or other structure.

We do not limit ourselves to any specific dust, however, as it is entirely possible in the practice of our invention to take the electrically precipitated dust derived from other reducing plants and, by sintering, or other appropriate or desired methods, remove such elements as are undesirable in paving mixtures and utilize the residue of stable dust to form the mineral content of the mixture.

The mixing of the bituminous substance and the electrically precipitated dust may be done in any suitable manner and in any suitable apparatus, such apparatus for stirring and commingling ingredients of this character together being well known in the art. Commonly the bituminous substance, reduced by heat to a proper fluidity, is stirred or agitated, and during such agitation the mineral, in the desired proportion, is added.

We claim:—

1. A non-precipitating plastic paving mixture of the class described composed of a bituminous substance and dust electrically precipitated from the floating discharges of mineral reducing plants.

2. A non-precipitating plastic paving mixture of the class described composed of a bituminous substance and dust electrically precipitated from the floating discharges of plants for reducing calcareous and argillaceous materials.

3. A non-precipitating plastic paving mixture of the class described composed of a bituminous substance and dust electrically precipitated from reducing plants for mechanically milling and crushing minerals.

4. A non-precipitating plastic paving mixture of the class described composed of a bituminous substance and slate dust electrically precipitated from reducing plants for mechanically milling and crushing slate bearing material.

5. A non-precipitating plastic paving mixture of the class described composed of asphalt and electrically precipitated mineral dust.

In testimony whereof we have hereunto set our hands.

JOSEPH R. DRANEY.
LEROY M. LAW.